United States Patent
Tsiatsis et al.

(10) Patent No.: US 9,154,476 B2
(45) Date of Patent: Oct. 6, 2015

(54) ATTACHING A SENSOR TO A WSAN

(75) Inventors: Vlasios Tsiatsis, Solna (SE); Mattias Johansson, Spånga (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 281 days.

(21) Appl. No.: 13/260,826

(22) PCT Filed: Apr. 7, 2009

(86) PCT No.: PCT/SE2009/050361
§ 371 (c)(1),
(2), (4) Date: Sep. 28, 2011

(87) PCT Pub. No.: WO2010/117310
PCT Pub. Date: Oct. 14, 2010

(65) Prior Publication Data
US 2012/0023564 A1  Jan. 26, 2012

(51) Int. Cl.
*H04L 29/06* (2006.01)
*H04L 29/08* (2006.01)
*H04W 12/06* (2009.01)
*H04W 84/18* (2009.01)

(52) U.S. Cl.
CPC ............... *H04L 63/08* (2013.01); *H04L 67/12* (2013.01); *H04W 12/06* (2013.01); *H04L 2209/805* (2013.01); *H04W 84/18* (2013.01)

(58) Field of Classification Search
CPC ...... H04W 84/18; H04W 12/06; H04L 67/12; H04L 2209/805
USPC ..................................... 726/7, 4, 6
See application file for complete search history.

(56) References Cited

U.S. PATENT DOCUMENTS

| | | | |
|---|---|---|---|
| 7,176,808 B1 * | 2/2007 | Broad et al. | 340/870.07 |
| 7,304,976 B2 * | 12/2007 | Mao et al. | 370/338 |
| 7,312,703 B2 * | 12/2007 | Hoogenboom | 340/540 |
| 7,398,164 B2 * | 7/2008 | Ogushi et al. | 702/42 |
| 7,530,113 B2 * | 5/2009 | Braun | 726/28 |
| 7,602,918 B2 * | 10/2009 | Mizikovsky et al. | 380/270 |
| 7,760,109 B2 * | 7/2010 | Broad et al. | 340/539.23 |
| 7,801,058 B2 * | 9/2010 | Wang | 370/254 |
| 7,814,322 B2 * | 10/2010 | Gurevich et al. | 713/171 |
| 7,877,596 B2 * | 1/2011 | Foo Kune et al. | 713/153 |
| 7,945,044 B2 * | 5/2011 | Sorniotti et al. | 380/28 |
| 8,041,997 B2 * | 10/2011 | Park et al. | 714/27 |
| 8,051,489 B1 * | 11/2011 | Montenegro | 726/29 |

(Continued)

OTHER PUBLICATIONS

Scalable Security in Wireless Sensor and Actuator Networks (WSANs); Fei Hu, Waqaas Siddiqui, Krishna Sankar; Security in Sensor Networks; 2006 CRC Press.*

(Continued)

*Primary Examiner* — James Turchen
(74) *Attorney, Agent, or Firm* — Patent Portfolio Builders, PLLC

(57) ABSTRACT

Methods and arrangements in a WSAN Gateway (15), a WSAN Manager (16) and a WSAN sensor for attaching an additional sensor (39) to a WSAN (12) comprising at least one existing WSAN sensor (33). The additional sensor emits an indication of its private identity after insertion in the WSAN, and the indication is received by the existing sensors in the WSAN and forwarded to the WSAN Gateway, after an eligibility check. Thereafter, the WSAN Gateway sends an authentication request to the WSAN Manager, which computes an authentication vector and transmits to the WSAN Gateway for the authentication of the new sensor.

39 Claims, 12 Drawing Sheets

(56) References Cited

U.S. PATENT DOCUMENTS

| | | | |
|---|---|---|---|
| 8,107,397 B1* | 1/2012 | Bagchi et al. | 370/254 |
| 8,116,243 B2* | 2/2012 | Zhiying et al. | 370/310 |
| 8,140,658 B1* | 3/2012 | Gelvin et al. | 709/224 |
| 8,280,057 B2* | 10/2012 | Budampati et al. | 380/270 |
| 8,305,935 B2* | 11/2012 | Wang | 370/254 |
| 8,321,171 B2* | 11/2012 | Borean et al. | 702/142 |
| 2003/0151513 A1* | 8/2003 | Herrmann et al. | 340/573.1 |
| 2005/0028001 A1* | 2/2005 | Huang et al. | 713/200 |
| 2005/0152305 A1* | 7/2005 | Ji et al. | 370/328 |
| 2007/0198708 A1* | 8/2007 | Moriwaki et al. | 709/224 |
| 2008/0263647 A1* | 10/2008 | Barnett et al. | 726/6 |
| 2009/0147714 A1* | 6/2009 | Jain et al. | 370/311 |
| 2009/0222541 A1* | 9/2009 | Monga et al. | 709/222 |
| 2009/0303905 A1* | 12/2009 | Lee et al. | 370/254 |
| 2010/0070760 A1* | 3/2010 | Vanderveen et al. | 713/156 |
| 2010/0287623 A1* | 11/2010 | Banik et al. | 726/30 |
| 2011/0010543 A1* | 1/2011 | Schmidt et al. | 713/168 |
| 2011/0023097 A1* | 1/2011 | McDiarmid et al. | 726/5 |
| 2011/0231535 A1* | 9/2011 | Starnes | 709/223 |
| 2011/0268274 A1* | 11/2011 | Qiu et al. | 380/270 |

OTHER PUBLICATIONS

Distributed Authentication of Program Integrity Verification in Wireless Sensor Networks; Katharine Chang and Kang G. Shin; ACM Transactions on Information and Systems Security, vol. 11, No. 3, Article 14, Pub. date: Mar. 2008.*

A Real-time Architecture for Automated Wireless Sensor and Actuator Networks; Yuanyuan Zeng et al.; 2009 Fifth International Conference on Wireless and Mobile Communications; 2009.*

PEAN: A Public Key Authentication Scheme in Wireless Sensor and Actor Network; Jianquin Ma et al.; Proceedings of the Sixth IEEE International Conference on Computer and Information Technology (CIT'06); 2006.*

Camtepe, Seyit A. and Buelent Yener, "Key Distribution Mechanisms for Wireless Sensor Networks: A Survey," Author's Address: Rensselaer Polytechnic Institute, Computer Science Dept., Lally 310, 110 8th St., Troy, NY 12180-3590, Technical Report TR-05-07, Mar. 23, 2005, 27 pages.

Chen, Chin-Ling and Cheng-Ta Li, "Dynamic Session-Key Generation for Wireless Sensor Networks," EURASIP J. on Wireless Communications and Networking, vol. 2008, Article ID 691571, 10 pages.

Gruenwald, Charles, et al., "SWARMS: A Sensornet Wide Area Remote Management System," Testbeds and Research Infrastructure for the Development of Networks and Communities, TridentCom 2007, 3rd International Conf. on Publication date: May 21-23, 2007, 10 pages.

Office Action dated Aug. 26, 2013, issued in Chinese Patent Application No. 200980158336.8, 6 paces.

Hu et al. "Scalable Security in Wireless Sensor and Actuator Networks (WSANS)" Security in Sensor Networks, 2006, 42 pages.

Communication dated Sep. 15, 2014, issued in Chinese Patent Application No. 200980158336.8, 9 pages.

* cited by examiner

ATTACHING A SENSOR TO A WSAN

CROSS REFERENCE TO RELATED APPLICATION

This application is a 35 U.S.C. §371 National Phase Entry Application from PCT/SE2009/050361 filed Apr. 7, 2009, and designating the United States.

TECHNICAL FIELD

The present invention relates to a method in a WSAN sensor, in a WSAN Gateway and in a WSAN Manager for attaching an additional sensor to a WSAN (a Wireless/Wired Sensor and Actuator Network). The invention also relates to a WSAN sensor, a WSAN Gateway and a WSAN Manager, each provided with an arrangement for attaching an additional sensor to a WSAN.

BACKGROUND

A Wireless/Wired Sensor and Actuator Network (WSAN), is a wireless/wired network of sensors and actuators, such as e.g. smoke detectors, water leak detectors, temperature sensors, humidity sensors, pressure sensors, vibration sensors, light sensors and light switches, to be deployed e.g. in a household or a car. The services of the WSAN are available remotely via a WSAN Gateway connected to a WAN (Wide Area Network), using a standardized communication protocol, e.g. the Ethernet or HTTP/SOAP, and another communication protocol, e.g. ZigBee, is used internally within the WSAN.

FIG. 1 illustrates a typical WSAN system, in which a number of WSAN sensors or actuators are connected via wire or radio in a single star or mesh topology to one or more WSAN Gateways which are connected to a WAN (Wide Area Network). The figure shows two WSANs, 12a, 12b, each WSAN connected to a WAN 14 via a WSAN Gateway, 15a, 15b, and comprising five sensors or actuators. The WSANs are available to the WAN users 11a, 11b via the WSAN Gateways, and the WSANs are operated via a WSAN Manager 16 by a WSAN operator 13.

Since a typical sensor is a simple embedded device that cannot be connected directly to a user or to an application in the WAN for security reasons, a WSAN Gateway acts as a mediator between the sensor nodes and the users/applications outside the domain of a WSAN. The WSAN Gateway is also capable of offering more sophisticated services than a single sensor node can offer. In a WSAN deployed in a house with several rooms, each room provided with a separate temperature sensor of the WSAN, the WSAN Gateway may provide e.g. the average temperature of the house to an external application, as well as the reading of the separate temperature sensors in the rooms. In order to provide this service, the WSAN Gateway requires suitable protocols and interfaces for requesting individual temperature readings from each sensor, and for presenting raw or aggregated data, such as the average temperature, in a format that is readable by the requesting application.

Thus, a WSAN Gateway requires a standardized data representation, as well as standardized interfaces with the various applications in a WAN. Additionally, the specific needs of business enablers have to be fulfilled in order to make commercial WSANs successful. The conventional Semantic Web Technology provides a standardized data representation, as well as a part of a standardized interface, and a WSAN Gateway using the Semantic Web Technology accesses individual sensors by using a standardized interface and maintains sensor data tagged with semantic metadata describing the meaning of the sensor data. Further, the WSAN Gateway uses a semantic web representation as an interface to the WSAN users and the WAN applications. The combination of the real sensor data and the semantic metadata forms a sensor data Ontology and sensor data Instantiation.

FIG. 2 illustrates an Ontology 21, according to the conventional Semantic Web Technology, the illustrated Ontology 21 representing a sensor node having a temperature sensor providing temperature readings in the Celsius scale, as well as an Instantiation 22 of the Ontology 21. Said Instantiation 22 comprises an identification of the real sensor, TempSensor1345, and well as a sensor measurement, 27.5, produced by the sensor, and the sensor identification and the sensor measurement are both linked to the Ontology 21, as illustrated by the arrows in FIG. 2. Thus, the Instantiation 22 indicates the identity of a specific temperature sensor, as well as the output from the temperature sensor, while the Ontology 21 describes how the constants of the Instantiation 22 are connected.

The WSAN Gateway has to be able to interact with each individual sensor attached to the WSAN, and a new sensor, not previously connected to the WSAN Gateway, has to be authenticated after insertion in the WSAN. The WSAN Gateway has to obtain the private identity, ID_S, of a new sensor, the service description, suitable drivers and gateway software, as well as the data representation of a new sensor to be able to interact with the sensor. The Ontology 21 and the Instantiation 22 illustrated in FIG. 2 show a data representation of an actual temperature sensor, but the actual mechanism of obtaining the identity of the sensor (TempSensor1345) and the sensor value (27.5) is not defined by the Ontology.

Currently, no automatic and secure method is available for attaching a new sensor to a WSAN and enabling updating of a WSAN Gateway with the service description, the software and the drivers for the new sensor, since a conventional commercial sensor has no software, or is a part of a closed WSAN system, to which no sensors should be added. Instead, sensor software and hardcoded descriptions of the data and the services offered by the sensor have to be developed specifically for the WSAN Gateway when a new sensor is added to a WSAN.

SUMMARY

The object of the present invention is to address the problem outlined above, and this object and others are achieved by the method and the arrangement according to the appended independent claims, and by the embodiments according to the dependent claims.

According to a first aspect, the invention provides a method for attaching an additional sensor to a WSAN comprising at least one existing WSAN sensor, an existing WSAN sensor performing the following steps:

Receiving and storing an indication of the private identity of a potential additional sensor from a WSAN Gateway.

Receiving, from an additional sensor, a beacon comprising an indication of the private identity of the additional sensor, when the additional sensor has been inserted in the WSAN.

Determining if the additional sensor is eligible for attachment to the WSAN by comparing the indication of the private identity received in the beacon with a previously stored indication of the private identity of a potential additional sensor, and sending a notification of the insertion of an eligible additional sensor to the WSAN Gateway, the notification comprising an indication of the private identity of the inserted eligible additional sensor.

The above step of determining if the additional sensor is eligible for attachment may further comprise a check that an activation time interval of the additional sensor has not expired, the activation time interval received and stored in connection with the indication of the private identity of the additional sensor.

The existing WSAN sensor may receive a listening request from the WSAN Gateway, the listening request indicating a listening status for the detection of a beacon from an additional sensor.

An additional sensor may perform the following steps, after insertion in the WSAN:
 Transmitting an indication of its private identity in a beacon to the existing WSAN sensors.
 Performing authentication with the WSAN Gateway, based on an authentication vector computed by the WSAN Manager.

The authentication may comprise an establishment of key shared between the additional sensor and the WSAN Gateway, based on said authentication vector, wherein the authentication may be performed according to the AKA protocol.

Further, a private identity, ID_S and a secret sensor key of a sensor may be pre-stored in a sensor database by the manufacturer, in connection with pointers to a software database.

According to a second aspect, the invention provides a method for attaching an additional sensor to a WSAN comprising at least one existing WSAN sensor, the additional sensor transmitting an indication of its private identity to the existing WSAN sensors after insertion in the WSAN. According to the method, a WSAN Gateway is performing the following steps:
 Receiving an indication of the private identity of an additional sensor from a WSAN Manager.
 Transmitting said received indication of the private identity of an additional sensor to the existing WSAN sensors.
 Receiving a notification from an existing WSAN sensor of the insertion of an eligible additional sensor in the WSAN, the notification comprising an indication of the private identity of the inserted eligible additional sensor.
 Performing authentication of the inserted additional eligible sensor, based on authentication information received from the WSAN Manager.

The WSAN Gateway may transmit a listening request to the existing WSAN sensors, the listening request indicating a listening status for detecting a beacon from an additional sensor.

Further, the WSAN Gateway may receive an activation time interval for an additional sensor from a WSAN manager and forward the activation time interval to the existing WSAN sensors, in connection with the transmission of the indication of the private identity of the additional sensor.

The WSAN Gateway may also transmit an authentication request comprising the private identity of the additional sensor to the WSAN Manager, after receiving the notification of the insertion of the additional eligible sensor in the WSAN.

The WSAN Gateway may receive a sensor description and sensor related software from the WSAN Manager, together with the authentication information, and perform the steps of:
 Updating a WSAN ontology based on the received sensor description, if the sensor node description comprises a WSAN sensor ontology.
 Storing the sensor related software in a local software database repository.

According to a third aspect, the invention provides a method for attaching an additional sensor to a WSAN comprising at least one existing WSAN sensor. According to the method, a WSAN Manager is performing the following steps,
 Registering the additional sensor.
 Retrieving the private identity and the secret sensor key of the additional sensor from a sensor database.
 Transmitting an indication of the private identity of the additional sensor to a WSAN Gateway.
 Computing an authentication vector for authentication of the additional sensor, based on the secret sensor key, after receiving an authentication request, comprising the private identity of the additional sensor, from the WSAN Gateway.
 Transmitting the authentication vector to the WSAN Gateway.

The WSAN Manager may determine an activation time interval for an additional sensor, and transmit the activation time interval to the WSAN Gateway, together with the indication of the private identity of the additional sensor.

Further, the WSAN manager may set up a secure communication channel to the WSAN Gateway, after receiving the private identity of the additional sensor.

The WSAN Manager may also retrieve the sensor description and the sensor related software from a software database of the manufacturer, after receiving a request from the WSAN Gateway, and transmit the sensor description and the sensor related software to the WSAN Gateway, together with the authentication vector.

According to a fourth aspect, the invention provides a WSAN sensor adapted to communicate with a WSAN Gateway. The WSAN sensor comprises an arrangement for attaching an additional sensor to a WSAN, the arrangement comprising:
 Means for receiving and storing an indication of the private identity of a potential additional sensor from the WSAN Gateway.
 Means for receiving a beacon comprising an indication of the private identity of an additional sensor, the beacon emitted by an additional sensor after insertion in the WSAN.
 Means for determining if the additional sensor is eligible for attachment to the WSAN, by comparing the indication of the private identity received in the beacon with a stored indication, and
 means for sending a notification of the insertion of an eligible additional sensor to the WSAN Gateway, the notification comprising an indication of the private identity of the eligible additional sensor.

The WSAN sensor may further comprise an arrangement for attachment to a WSAN comprising at least one existing WSAN sensor, the arrangement comprising:
 Means for transmitting an indication of the private identity in a beacon to the existing WSAN sensors, after insertion into the WSAN, and
 means for performing an authentication with the WSAN Gateway, based on an authentication vector from the WSAN Manager.

According to a fifth aspect, the invention provides a WSAN Gateway arranged to communicate with a WSAN Manager and WSAN sensors. The WSAN Gateway comprises an arrangement for attaching an additional sensor to a WSAN comprising at least one existing WSAN sensor, the additional sensor transmitting an indication of its private identity to the existing WSAN sensors after insertion in the WSAN. Said WSAN Gateway arrangement comprises:

Means for receiving an indication of the private identity of the additional sensor from the WSAN Manager, and forwarding the indication to the existing WSAN sensors.

Means for receiving a notification from an existing WSAN sensor of the insertion of an eligible additional sensor in the WSAN, and means for authentication of the inserted additional sensor, based on an authentication vector received from the WSAN Manager.

Said authentication may comprise the establishment of a shared security key, KS, with the inserted additional sensor.

According to a sixth aspect, the invention provides a WSAN Manager for managing a WSAN, and arranged to communicate with a WSAN Gateway. The WSAN Manager comprises an arrangement for attaching an additional sensor to a WSAN comprising at least one existing WSAN sensor, and the arrangement comprises:

Means for retrieving the private identity and the secret sensor key of the additional sensor from a sensor database, after registering the additional sensor, and forwarding an indication of the private identity of the additional sensor to a WSAN Gateway, and means for computing an authentication vector for authentication of the additional sensor, based on the secret sensor key, after receiving an authentication request from the WSAN Gateway, and forwarding the authentication vector to the WSAN gateway.

The arrangement may further be adapted to pre-store the identity of a WSAN Gateway associated with a user subscription.

An advantage with embodiments of the present invention is that they accomplish an automatic and network-assisted attachment of an addition sensor in a WSAN, involving authentication and establishment of a secure communication between the sensor and the WSAN Gateway.

Another advantage is that an attached additional sensor can be used almost instantly, by means of an automatic updating of the WSAN service description and software in the WSAN Gateway based on the new sensor, as well as based on the composition of the whole WSAN.

BRIEF DESCRIPTION OF THE DRAWINGS

The present invention will now be described in more detail, and with reference to the accompanying drawings, in which.

DETAILED DESCRIPTION

Figure 1:
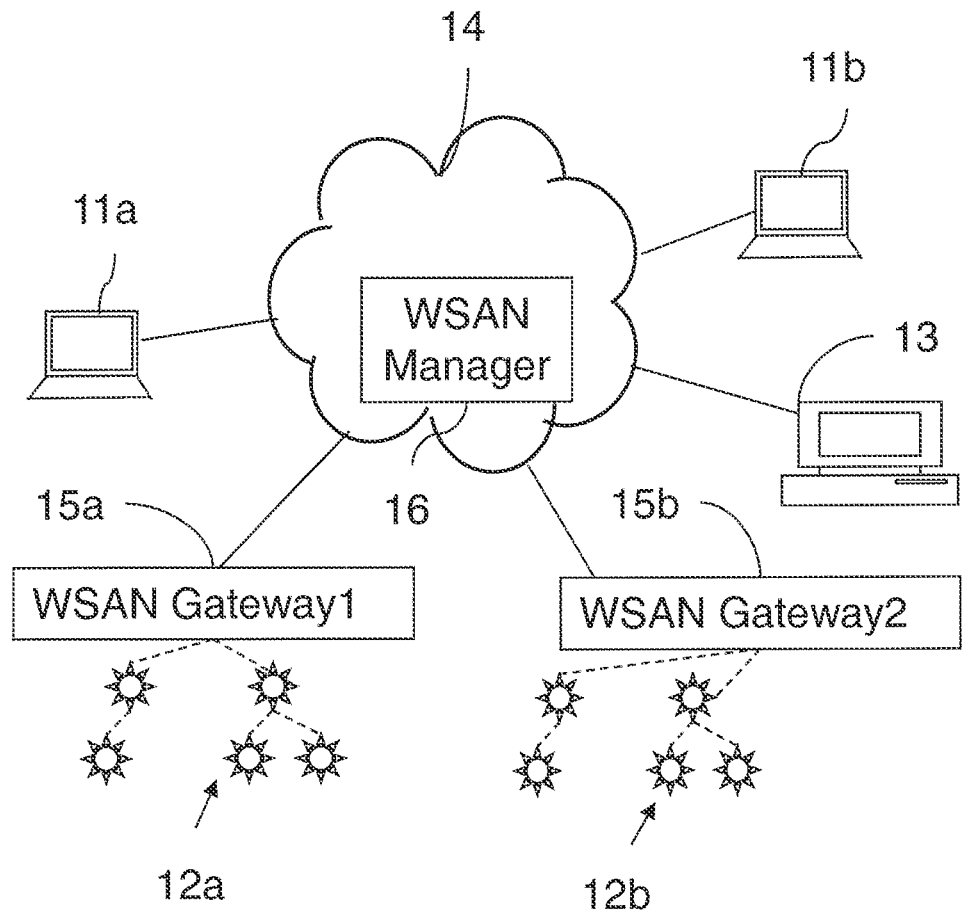
FIG. 1 illustrates schematically the architecture of an exemplary WSAN-system.
Figure 2:
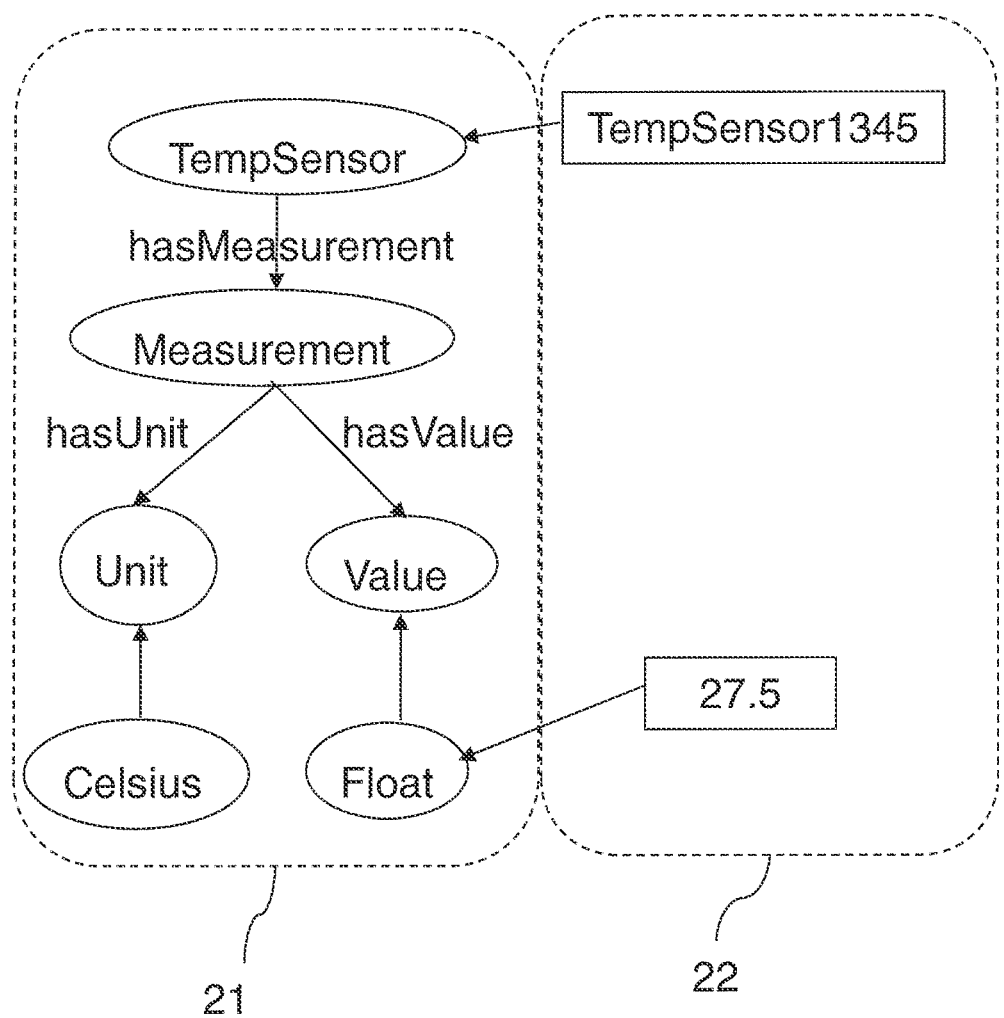
FIG. 2 illustrates an exemplary ontology and instantiations.

In the following description, specific details are set forth, such as a particular architecture and sequences of steps in order to provide a thorough understanding of the present invention. However, it is apparent to a person skilled in the art that the present invention may be practised in other embodiments that may depart from these specific details.

Moreover, it is apparent that the described functions may be implemented using software functioning in conjunction with a programmed microprocessor or a general purpose computer, and/or using an application-specific integrated circuit. Where the invention is described in the form of a method, the invention may also be embodied in a computer program product, as well as in a system comprising a computer processor and a memory, wherein the memory is encoded with one or more programs that may perform the described functions.

The term "sensor" is hereinafter referring to a sensor or an actuator.

Normally, before a new sensor is inserted in a WSAN, a user purchases the sensor from a manufacturer, with the purpose of installing the new sensor in his/her WSAN that is managed by a WSAN Operator via a WSAN Manager. After the purchase, the user registers the new sensor with the WSAN Manager, in which the identities of the WSAN Gateways, ID_G, linked to the user, have been previously stored. At the registration, the open identifier, ID_SO, of the sensor is stored in the WSAN Manager, together with the identity of the user and the identity of a particular WSAN Gateway, as well as the identity of the sensor database, SDB, in which a private identity, ID_S, and a secret sensor key of the new sensor have been pre-stored by the manufacturer. Further, the WSAN Gateway maintains a description of the hardware, software, and services of the WSAN sensors, e.g. as an Ontology.

According to a preferred embodiment of the invention, the WSAN Manager 16 retrieves the private identity, IS_S, and a secret sensor key of a new sensor from the sensor database, after having registered a user of a new sensor, and transmits an indication of the private identity to the WSAN Gateway 15. The WSAN Gateway, in turn, forwards the indication of the private identity of a potential and eligible new sensor to all the existing sensors in the WSAN 12.

Later, when the new sensor is inserted in the WSAN and switched on, the new sensor starts to emit a beacon with an indication of its private identity to the existing sensors in the WSAN, within reach for radio contact with the new sensor, and the beacon may also include identification data derived from the private identity. The existing sensors are expecting to receive a beacon from a new sensor, and according to the preferred embodiment, an existing sensor that receives a beacon will check the eligibility of the new sensor, and forward a notification to the WSAN Gateway when a new eligible sensor is actually inserted in the WSAN. The eligibility check comprises a comparison between an indication of a private identity received in a beacon from a new sensor inserted in the WSAN, and a stored indication, previously received from the WSAN Gateway, of a private identity of a new eligible sensor.

Upon reception of a notification from an existing sensor of the insertion of an eligible new sensor in the WSAN, the WSAN Gateway will send an authentication request to the WSAN Manager, and the WSAN Manager will compute an authentication vector, based on the secret sensor key associated with the new sensor, and transmit the vector to the WSAN Gateway for the authentication of the new sensor.

According to an alternative embodiment, the eligibility check of the new sensor is performed by the WSAN Gateway, and an existing sensor that receives a beacon from a new sensor will forward a notification comprising sensor identification information to the WSAN Gateway. Advantageously, however, the eligibility check is performed by an existing sensor, in order to avoid unnecessary transmission of information to the WSAN Gateway, and save sensor battery capacity.

According to a further embodiment of the invention, the WSAN Gateway transmits a listening request to the existing sensors, in connection with the transmission of the indication of the private identity, and the listening request activates a certain listening status in the existing sensor for the detection of a beacon from a new sensor. According to alternative exemplary embodiments, the listening status indicates a continuous listening until a beacon from a new sensor is detected, or listening during certain pre-determined clock intervals, which can save sensor battery capacity.

An advantage with the present invention is that if an existing sensor picks up a beacon from a node, without having stored any previous indication of its private identity, a new malicious/non-authenticated node may have been detected, and the user may be alerted through the WSAN Gateway.

According to a still further exemplary embodiment, the eligibility check of an additional sensor further comprises a check that a predetermined activation time interval of the sensor has not expired. This embodiment involves a WSAN Manager determining a relevant activation time interval at the registration of the new sensor, and forwarding the activation time interval to the WSAN Gateway, together with an indication of the private identity of the new sensor. The WSAN Gateway, in turn, forwards the activation time interval to the existing sensors, together with the indication of the private identity of a potential additional sensor in the WSAN. Thereby, when the existing sensor receives a beacon comprising an indication of the private identity of the additional sensor, the existing sensor is able to include a check that the activation time interval has not expired in the determination of the eligibility of the new additional sensor.

Alternatively, in case the eligibility check is performed by the WSAN Gateway, the activation time interval is stored in the WSAN Gateway.

Further, the eligibility check may comprise a control of other policies, e.g. regarding the geographic location of the sensor within the WSAN.

This invention involves the authorization of a new sensor to join an existing WSAN comprising at least one sensor, as well as the initial key management associated with the new sensor. The invention also involves an updating of the service descriptions maintained in the WSAN Gateway of the WSAN, as well as of the software in the WSAN Gateway for using the new sensor When a new sensor joins a WSAN, according to the invention, a secure connection is established with the WSAN Gateway in order to enable encryption and authentication of the data traffic between the sensor and the WSAN Gateway. The WSAN manager pushes the description of the new sensor, e.g. its capabilities and services, such as driver and service software, down to be installed in the WSAN Gateway.

Each sensor is identified and authenticated with a private identity of the sensor, ID_S, and with a secret sensor key, which are initially stored in a sensor database, SDB, by the manufacturer, together with an open identifier, ID_SO, which may e.g. be printed on the sensor. The ID_SO may or may not depend on ID_S in such a way so that ID_SO=f(ID_S) where f may be a cryptographically secure one-way function. Thus, the sensor manufacturer installs ID_S, ID_SO and the secret sensor key in a new sensor, and stores this information in a sensor database, SDB, along with the contact information pointers to its software database.

As described above, the identity of a particular WSAN Gateway linked to the user is stored in the WSAN Manager, together with the identity of new sensor, to enable the establishment of a secure connection. The WSAN Manager node may be an application server of a third party, and the WSAN Gateway will use a suitable protocol, e.g. the GBA (the Generic Boostrap Architecture) to bootstrap and enroll to the application server of the third party.

Figure 3:
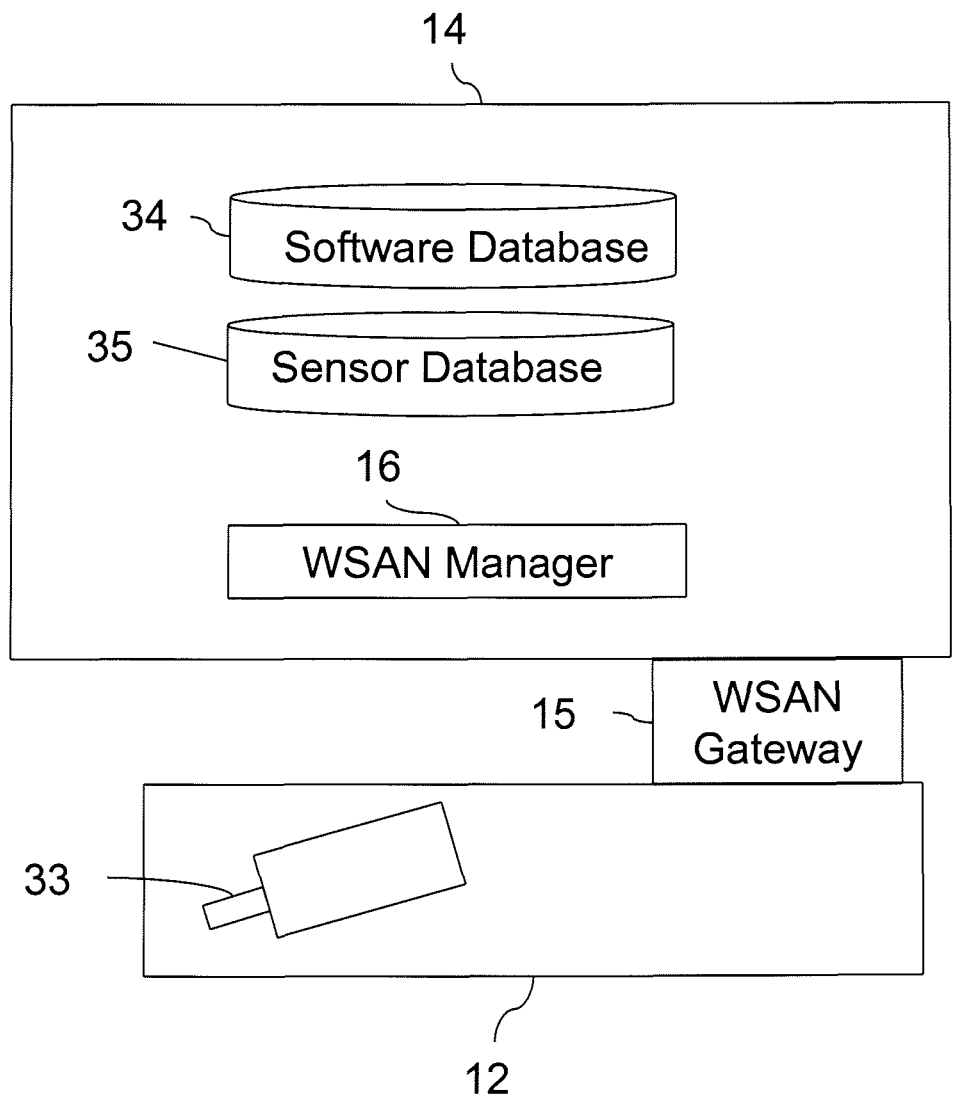
FIG. 3 illustrates schematically a WAN, a WSAN Gateway and a WSAN comprising one sensor.

FIG. 3 illustrates schematically a WAN (Wide Area Network) 14, including a WSAN Manager 16, a sensor database 35 and a software database 34 of the manufacturer. This figure also illustrates a WSAN 12, including one existing sensor 33, as well as the WSAN Gateway 15 connecting the WSAN to the applications of the WAN.

When a user has registered a new sensor with the WSAN Manager 16, for attachment to the WSAN 12, the WSAN Manager will retrieve the private identity, IS_S, and a secret sensor key of the new sensor from the sensor database 35, using the open identifier, ID_SO, of the sensor. The WSAN Manager will also retrieve contact information pointers, e.g. URL, to the software database 34 from the sensor database 35. At this point in time, the sensor database 35 may erase the private identity and the secret sensor key of the new sensor. The contact information pointers to the software database 34 of the sensor manufacturer is used by the WSAN Manager 16 to retrieve the sensor description, such as capabilities and services, as well as the sensor software, such as drivers and service software, from the software database for installment in the WSAN Gateway 15. The new sensor and the WSAN Gateway 15 may use e.g. the AKA-protocol (Authentication and Key Agreement) to perform the mutual authentication and the key establishment.

When the WSAN Manager 16 has retrieved the private identity of a new sensor from the sensor database 35, it sets up a secure channel to the WSAN Gateway 15 of the user and transmits the private identity, and the WSAN Gateway will transmit it further to each existing sensor 33 in the WSAN 12. When the new sensor is inserted in its final environment in the WSAN 12 and switched on, it immediately starts to search for a WSAN by emitting beacons containing an indication of its private identity, such as e.g. the private sensor identity ID_S, or the tuple (r, f(r, ID_S)) where r is a random number and f a cryptographically strong one-way function. When a beacon is picked up by an existing sensor 33 in the WSAN, the receiving existing sensor will check that it comes from an eligible new sensor, by comparing the indication of the private identity included in the beacon with the private identity previously received from the WSAN Gateway. If the beacon includes said tuple, the existing sensor 33 is configured to calculate the function f(r, IS_S) in order to verify that the new sensor is eligible. Upon verification of the eligibility of the new sensor, the WSAN Gateway will be notified by an existing sensor 33 of the insertion of the new sensor, and the WSAN Gateway will check that it no beacon has been received previously from that particular sensor. If so, the WSAN Gateway sets up a secure connection to the WSAN Manager and transmits an authentication request to the WSAN Manager containing an indication of the private identity of the new sensor, the indication being e.g. the private identity, ID_S, or the tuple described above.

When the WSAN Manager receives the authentication request concerning a particular sensor from the WSAN Gateway, the WSAN Manager will check that the private identity, ID_S, of the sensor is linked with the identity of the requesting WSAN Gateway, ID_G, and if so, the WSAN Manager computes an authentication vector. According to an exemplary embodiment of the authentication procedure, the WSAN Manager uses a sequence number NR, the secret sensor key plus an additional nonce NONCE generated by the WSAN Manager itself to compute the authentication vector. The authentication vector contains a key, KS, an expected response, XRES, and an authentication token, AUTN, which are returned to the WSAN Gateway, together with NONCE. The WSAN Gateway now forwards the NONCE and the AUTN to the new sensor, which uses the NONCE together with its secret sensor key to verify that the AUTN comes from a trusted source and that the message is freshly generated.

If the new sensor is out of range of a direct radio communication with the WSAN Gateway, the communication of the authentication token may use a path over the existing sensor 33 that transmitted the notification of the new sensor to the WSAN Gateway. Possibly, said path may use several existing sensors in order to establish a point-to-point connection between the new sensor and the WSAN Gateway. The new sensor also computes the key, KS, and a response, RES, and RES is then transmitted to the WSAN Gateway to be compared with XRES received previously from the WSAN Manager. If they match, the WSAN gateway proceeds with establishing local keys in the WSAN.

The above-described exemplary authentication procedure could e.g. be based on the MILENAGE algorithm. The local keys in the WSAN are often based on different group keys, and specific applications or geographically close sensors could also have different keys. However, these keys are all bootstrapped from the key, KS, shared between the WSAN gateway and the sensor, as described above.

Figure 4:
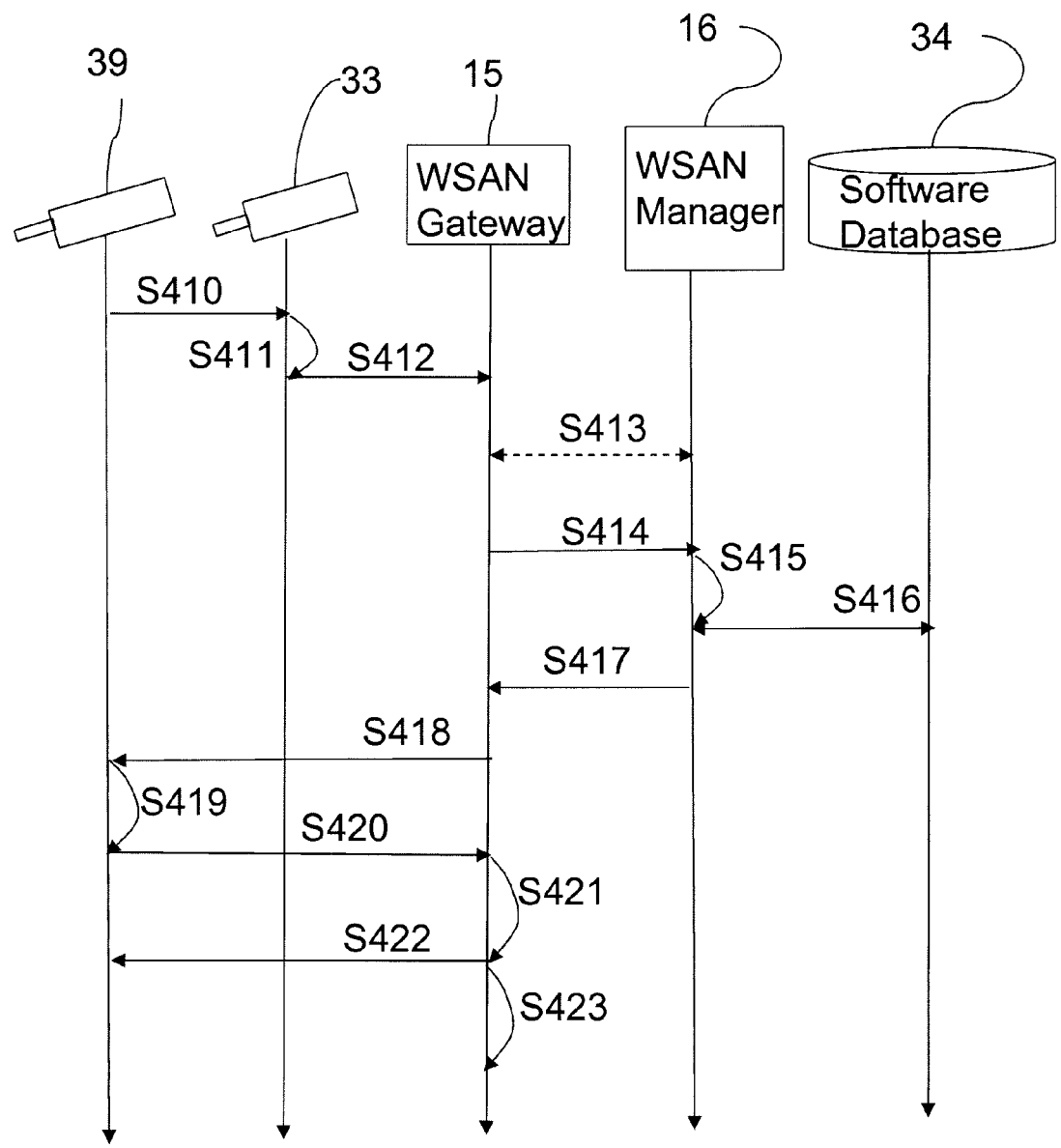
FIG. 4 is a signalling diagram illustrating the addition of a new sensor in a WSAN.

FIG. 4 is a signalling diagram illustrating the above-described exemplary authentication procedure between a new sensor 39 and the WSAN Gateway 15, after the insertion of the new sensor 39 in the WSAN, the attachment and authentication assisted by at least one existing sensor 33 in the WSAN, the WSAN Manager 16 and the software database 34.

In step S410 in FIG. 4, when the new sensor 39 has been switched on after insertion in the WSAN, the new sensor transmits a beacon indicating its private identity, ID_S, e.g. the tuple (r, f(r, ID_S) to the existing sensor/s/33 in the WSAN. In step S411, the receiving existing sensor compares the received private identity with the stored private identity of an eligible new sensor previously received from the WSAN Gateway, or alternatively, calculates the function f(r, ID_S). If there is a match, said receiving existing sensor 33 transmits the private identity of the new sensor, in step S412, in a notification message to the WSAN Gateway. In step S413, a secure connection is established between the WSAN Gateway 15 and the WSAN Manager 16, and the WSAN Gateway sends an authentication request to the WSAN Manager in step S414, the request forwarding the private identity, ID_S, of the new sensor. In step S415, the WSAN Manager computes the authentication vector, and retrieves the sensor node description and sensor node software from the software database of the sensor node manufacturer, in step S416. In step S417, the WSAN Manager transmit KS, XRES, AUTN, NONCE to the WSAN Gateway, and may also push the sensor node description and sensor node software to the WSAN Gateway, as well. In step S418, the WSAN Gateway transmit AUTN, NONCE to the new sensor 39, and the new sensor verifies AUTN and compute KS and RES, in step S419, and transmits RES to the WSAN Gateway, in step S420. In step S421, the WSAN Gateway determines if RES=XRES, and if yes, establishes a new key based on KS. If no, it drops the contact, removes the sensor node descriptions and software, and informs the user and the WSAN Manager. In step S422, the attachment of the new sensor is continued, using KS as a security bootstrapper, and in step S423, the WSAN Gateway installs the new sensor description and sensor node software in order to handle the new sensor.

Figure 5:
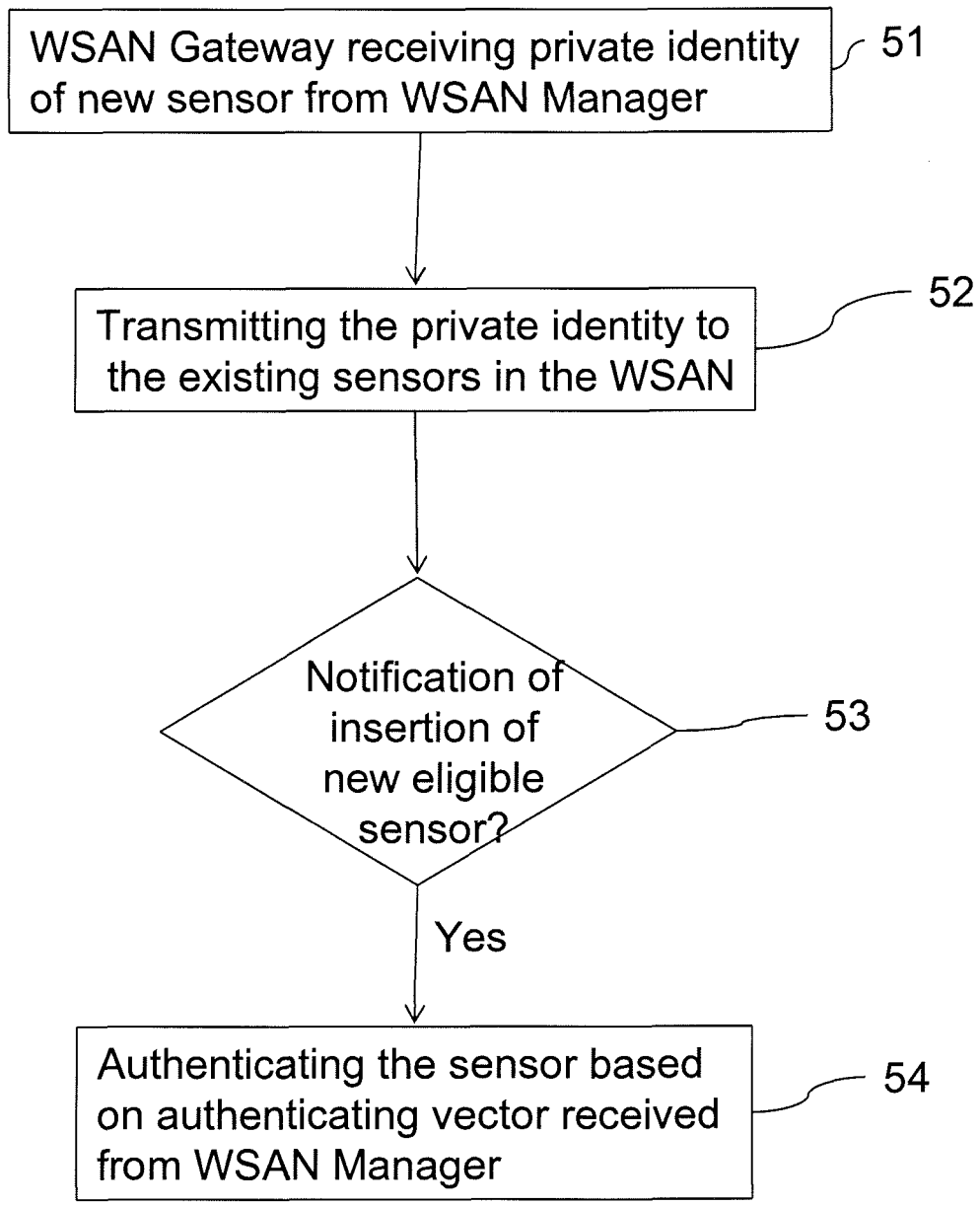
FIG. 5 is a flow diagram illustrating the steps performed by a WSAN Gateway when a new sensor is attached to a WSAN.
Figure 6A:
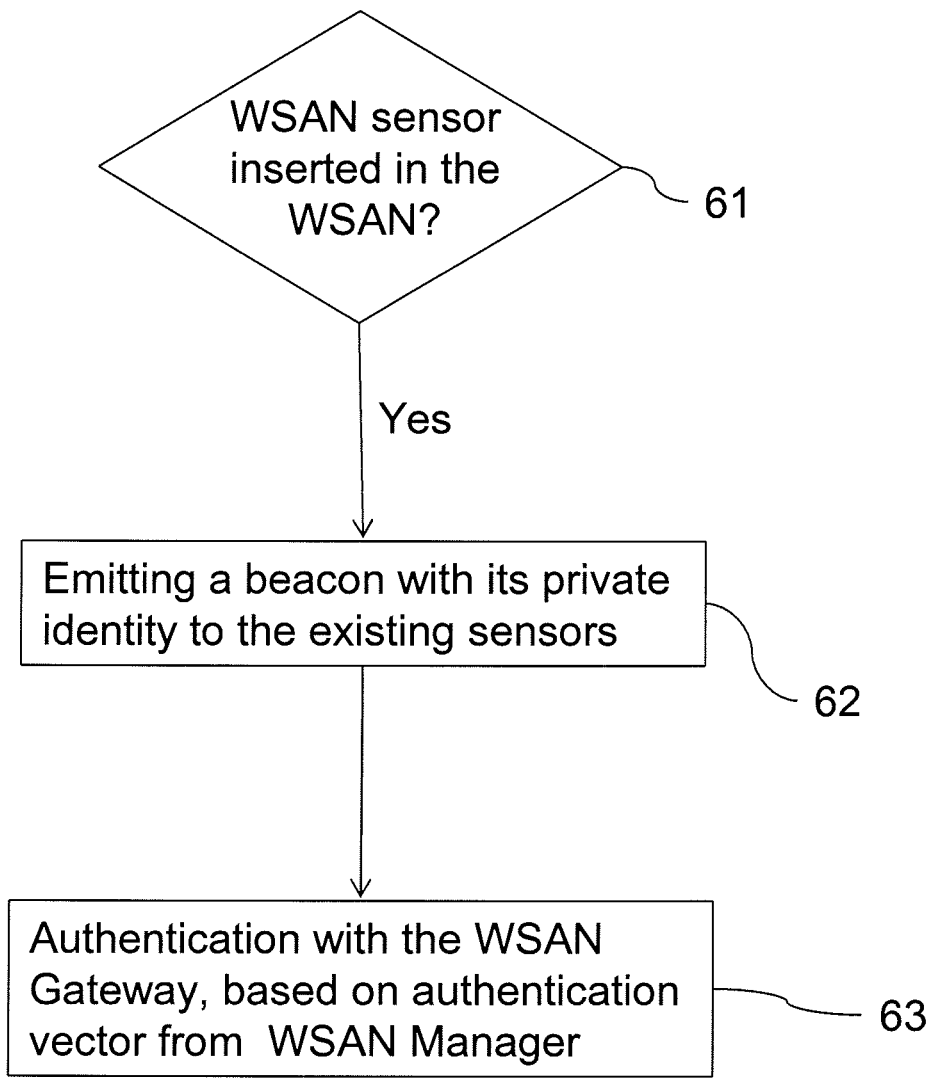
FIG. 6a is a flow diagram illustrating the steps performed by a new sensor when it is attached to a WSAN.
Figure 6B:
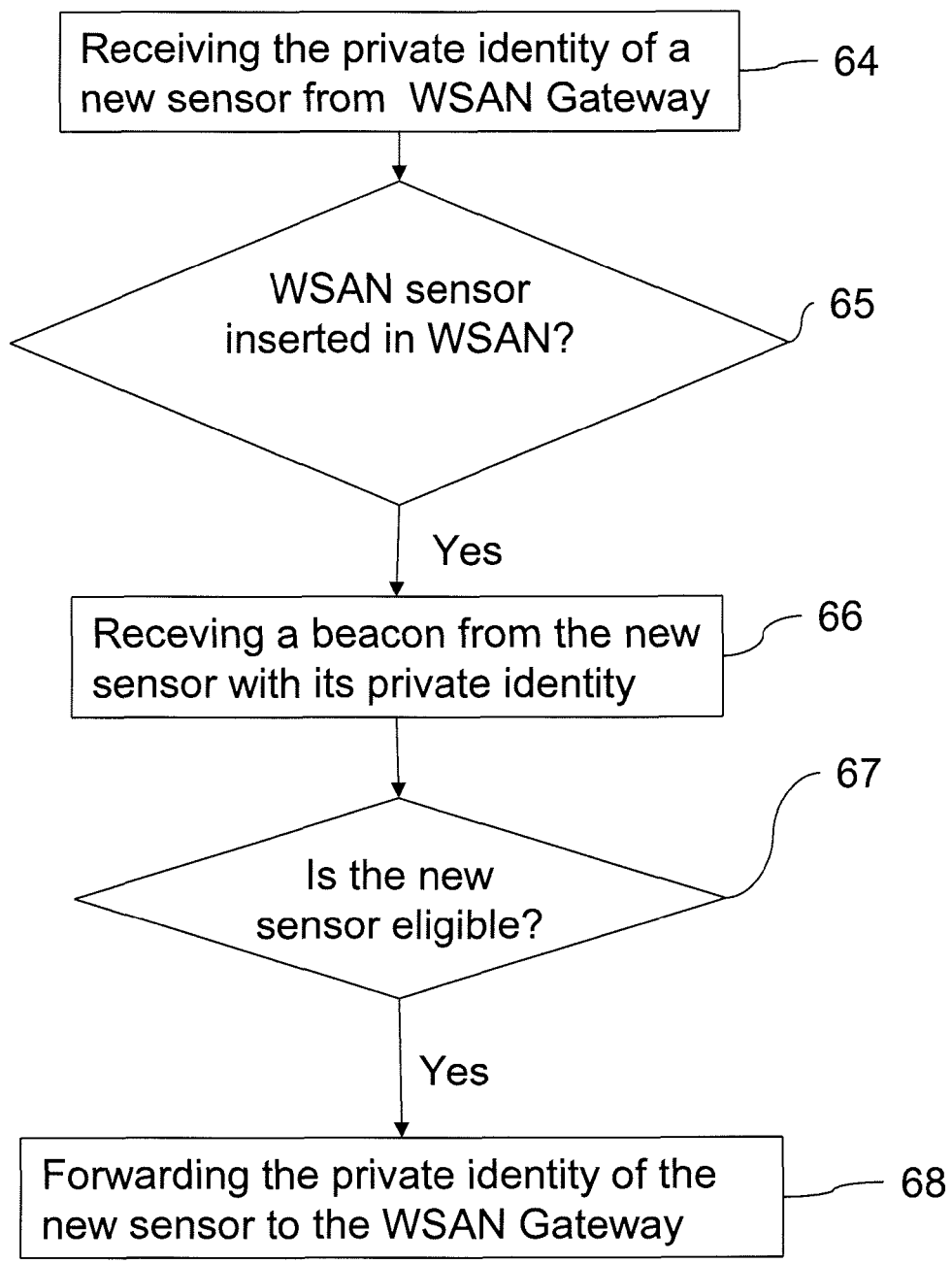
FIG. 6b is a flow diagram illustrating the steps performed by an existing sensor when a new sensor is attached to the WSAN.
Figure 7:
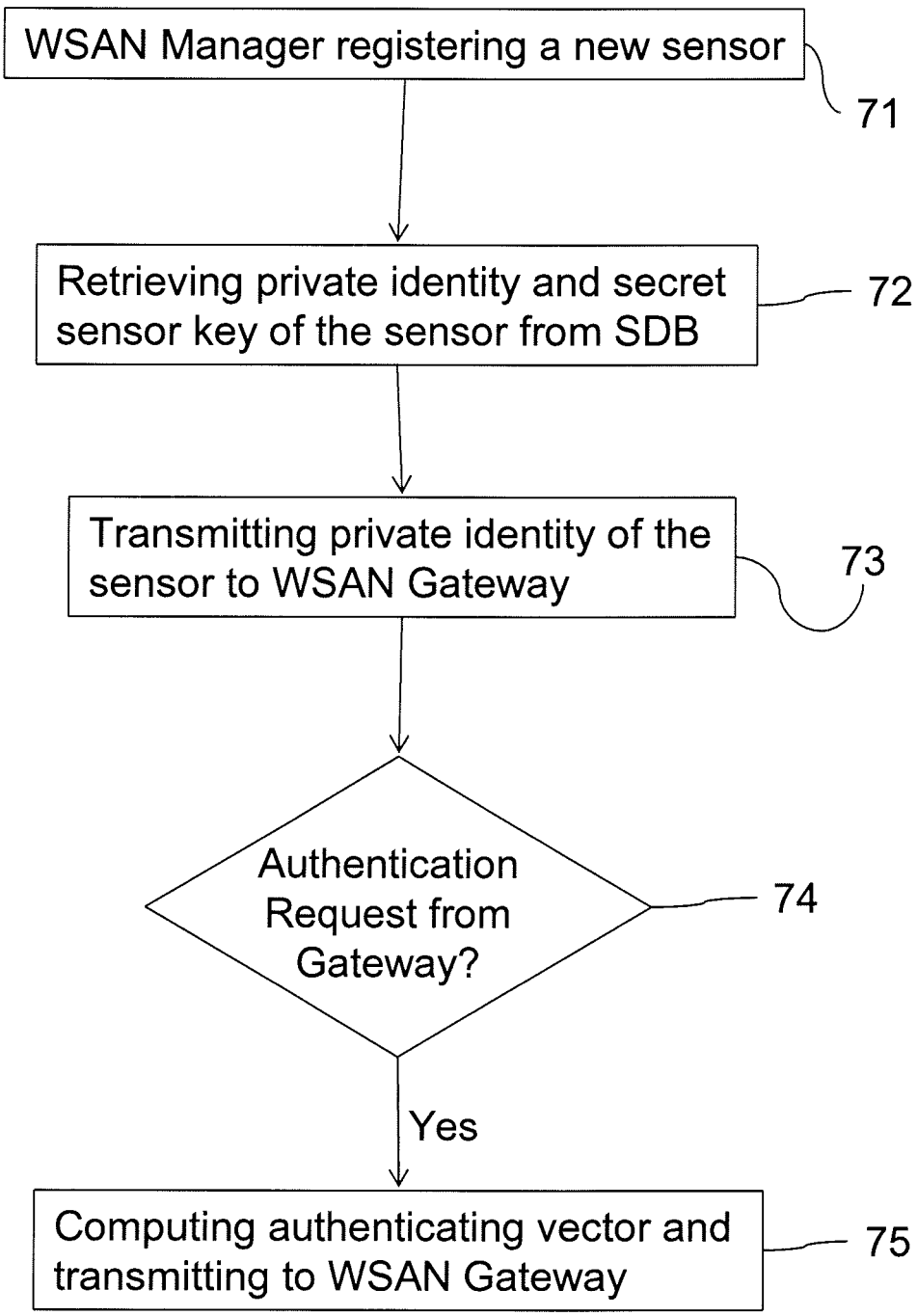
FIG. 7 is a flow diagram illustrating the steps performed by a WSAN Manager when a new sensor is attached to a WSAN.

FIGS. 5-7 are flow diagrams illustrating the steps performed by a WSAN Gateway 15, by an additional sensor 39, by an existing sensor 33, and by a WSAN Manager 16, during the attachment of an additional sensor 39 to a WSAN, according to a first exemplary embodiment of this invention.

In FIG. 5, the WSAN Gateway receives an indication of the private identity of a potential additional sensor that eventually will be attached to the WSAN from the WSAN Manager, in step 51. In step 52, the WSAN Gateway forwards an indication of the private identity of the additional sensor to the existing sensors in the WSAN. When the additional sensor has been inserted in the WSAN, it will emit a beacon comprising an indication of its private identity, e.g. a tuple, and this beacon will be received by at least one of the existing sensors. The receiving existing sensor will check the eligibility by comparing the received private identity with the private identity previously received from the WSAN Gateway in step 52, and if the private identities match, the existing sensor will send a notification of the insertion of the additional sensor to the WSAN Gateway. If a tuple is received, the existing sensor must calculate the tuple and compare it with the one transmitted by the additional sensor. If these two match, the existing sensor will send a notification of the insertion of the additional sensor to the WSAN Gateway. When the WSAN Gateway receives the notification, in step 53, it performs an authentication procedure, in step 54, based on an authentication vector received from the WSAN Manager.

In FIG. 6a, when an additional sensor 39 has been inserted in the WSAN, in step 61, the additional sensor emits a beacon, in step 62, comprising an indication of its private identity. This beacon will be received by an existing sensor, which will forward the notification to the WSAN Gateway, if the indication of a private identity received in the beacon matches a stored indication of a private identity previously received from the WSAN Gateway. When the WSAN Gateway receives the notification, it performs an authentication procedure with the additional sensor, in step 63, based on an authentication vector from the WSAN Manager.

FIG. 6b is a flow diagram illustrating the steps performed by an existing sensor in the WSAN when an additional sensor is attached to the WSAN. In step 64, the existing sensor receives and stores an indication of the private identity, e.g. the tuple, of a potential additional sensor from the WSAN Manager, via the WSAN Gateway. When an additional sensor has been inserted in the WSAN, as illustrated by the determining step 65, the existing sensor will receive a beacon from the additional sensor, in step 66, the beacon comprising an indication of private identity of the additional sensor. In step 67, the existing sensor will determine if the additional sensor is eligible to be attached to the WSAN, by comparing the received private identity with the private identity previously received from the WSAN Gateway, (or the tuples), in step 64, and if the private identities, or the tuples, are equal, the existing sensor will send a notification of the insertion of an eligible additional sensor to the WSAN Gateway, the notification comprising an indication of the private identity of the sensor, in step 68.

In FIG. 7, the WSAN Manager registers a new sensor of a user, in step 71, to be attached to the WSAN. In step 72, the WSAN Manager retrieves the private identity of the additional sensor, as well as the secret sensor key, from the sensor database, and in step 73, the WSAN Manager forwards the private identity of the additional sensor to the appropriate WSAN Gateway associated with the user. When the additional sensor has been inserted in the WSAN, it will emit a beacon comprising an indication of its private identity, and this beacon will be received by at least one of the existing sensors. The receiving existing sensor will compare the received indication of the private identity with a stored private identity previously received from the WSAN Gateway, and if the private identities are equal, the existing sensor will send a notification of the insertion of an additional eligible sensor to the WSAN Gateway. When the WSAN Gateway receives this notification of the insertion of an eligible sensor in the WSAN, the WSAN Manager will receive an authentication request from the WSAN Gateway, in step 74, and in response compute an authentication vector and transmit to the WSAN Gateway, in step 75.

Figure 8:
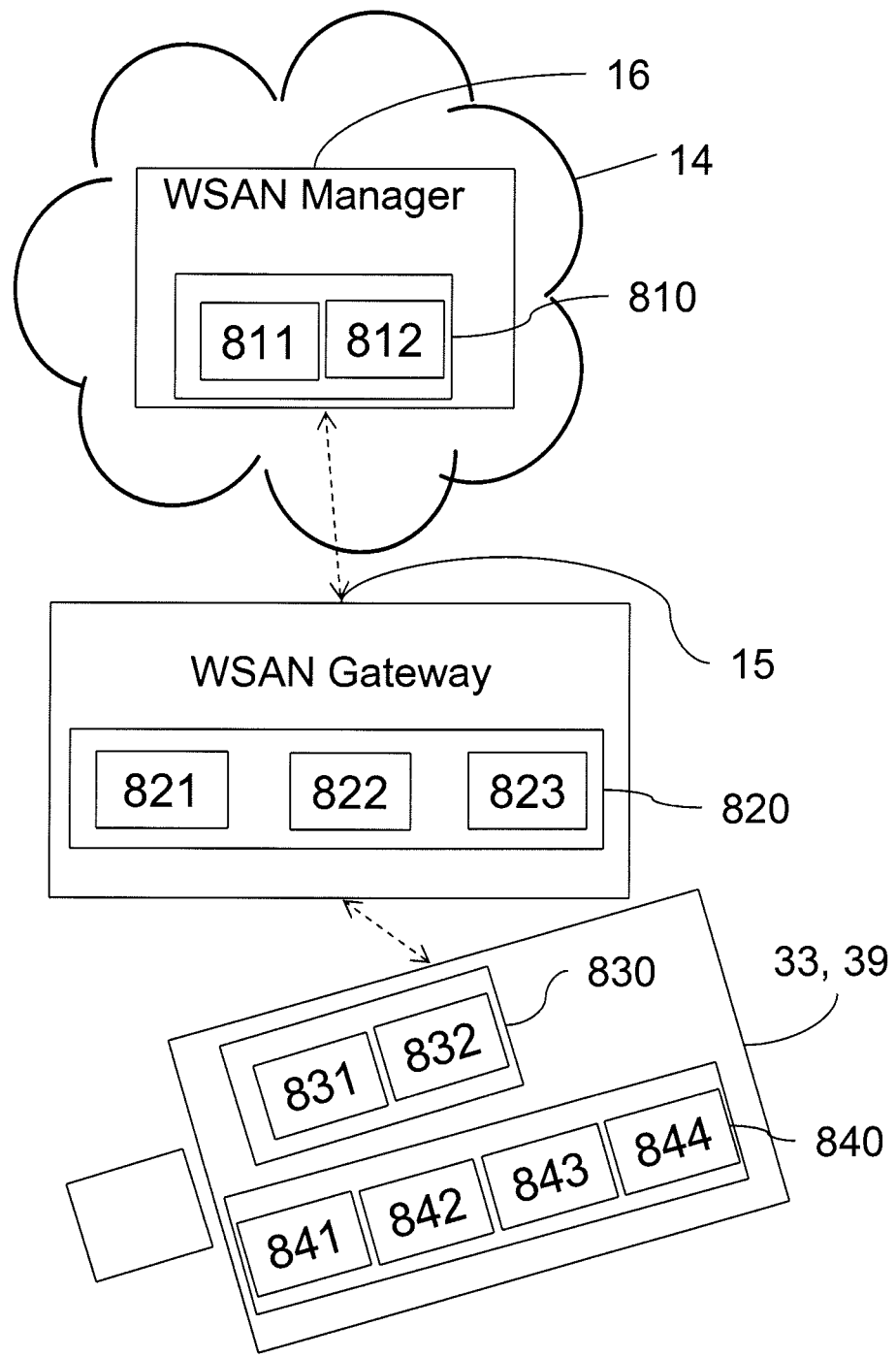
FIG. 8 illustrates schematically a WSAN Manager, a WSAN Gateway and a WSAN sensor, according to an exemplary embodiment of this invention.

Further, FIG. 8 illustrates schematically a WSAN Manager 16, a WSAN Gateway 15 and a WSAN sensor 33, 39, according to exemplary embodiments of the invention, the WSAN Manager and the sensor arranged to communicate with the WSAN Gateway.

The WSAN Manager 16 is provided with an arrangement 810 for attaching an additional sensor to a WSAN comprising at least one existing sensor. The arrangement 810 comprises means 811 for retrieving the private identity and the secret sensor key of said additional sensor from a sensor database, after registering a user of the sensor, and forwarding the private identity to the WSAN Gateway. The arrangement also comprises means 812 for computing an authentication vector for authentication of the additional sensor, based on the secret sensor key, after receiving an authentication request from the WSAN Gateway, and forwarding the authentication vector to the WSAN gateway. The arrangement is further provided with means (not illustrated in the figure) for storing the user identity, together with the identity of the WSAN Gateway, and the private identity of the new sensor.

It should be noted that the means illustrated in FIG. 8 may be implemented by physical or logical entities using software functioning in conjunction with a programmed microprocessor or general purpose computer, and/or using an application specific integrated circuit (ASIC).

The WSAN Gateway 15 is provided with an arrangement 820 for attaching an additional sensor to a WSAN comprising at least one existing sensor, the additional sensor transmitting an indication of its private identity to the existing sensors after insertion in the WSAN. The arrangement comprises means 821 for receiving the private identity of the additional sensor from the WSAN Manager, and forwarding an indication of the private identity to the existing sensors in the WSAN, means 822 for receiving a notification from an existing sensor of the insertion of an eligible additional sensor in the WSAN, and means 823 for authentication of the inserted additional sensor, based on an authentication vector received from the WSAN Manager. The arrangement is further provided with means (not illustrated in the figure) for storing the software of the new sensor.

The WSAN sensor 33, 39 is provided with an arrangement 840 for attaching an additional sensor to a WSAN. The arrangement 840 comprises means 841 for receiving and storing an indication of the private identity of a potential additional sensor from the WSAN Gateway, means 842 for receiving a beacon comprising an indication of the private identity of an additional sensor, the beacon emitted by the additional sensor when it is inserted in the WSAN, means 843 for determining the eligibility of the additional sensor by comparing the private identity received in a beacon with a stored private identity previously received from the WSAN Gateway, and means 844 for sending a notification of the insertion of the new eligible sensor to the WSAN Gateway, if the private identities are equal.

The WSAN sensor 33, 39 is further provided with an arrangement 830 for attaching to a WSAN comprising at least one existing sensor, the arrangement 830 comprising means 831 for emitting a beacon including an indication of its private identity after insertion into the WSAN, to be received by the existing sensors within radio contact, and means 832 for performing an authentication with the WSAN Gateway, based on an authentication vector from the WSAN Manager and transmitted to the new sensor by the WSAN Gateway.

The WSAN sensor 33, 39 is further provided with means (not illustrated in the figure) for storing sensor data installed by the manufacturer, such as its private identity, ID_S, open identifier, IS_S, and secret sensor key.

Figure 9:
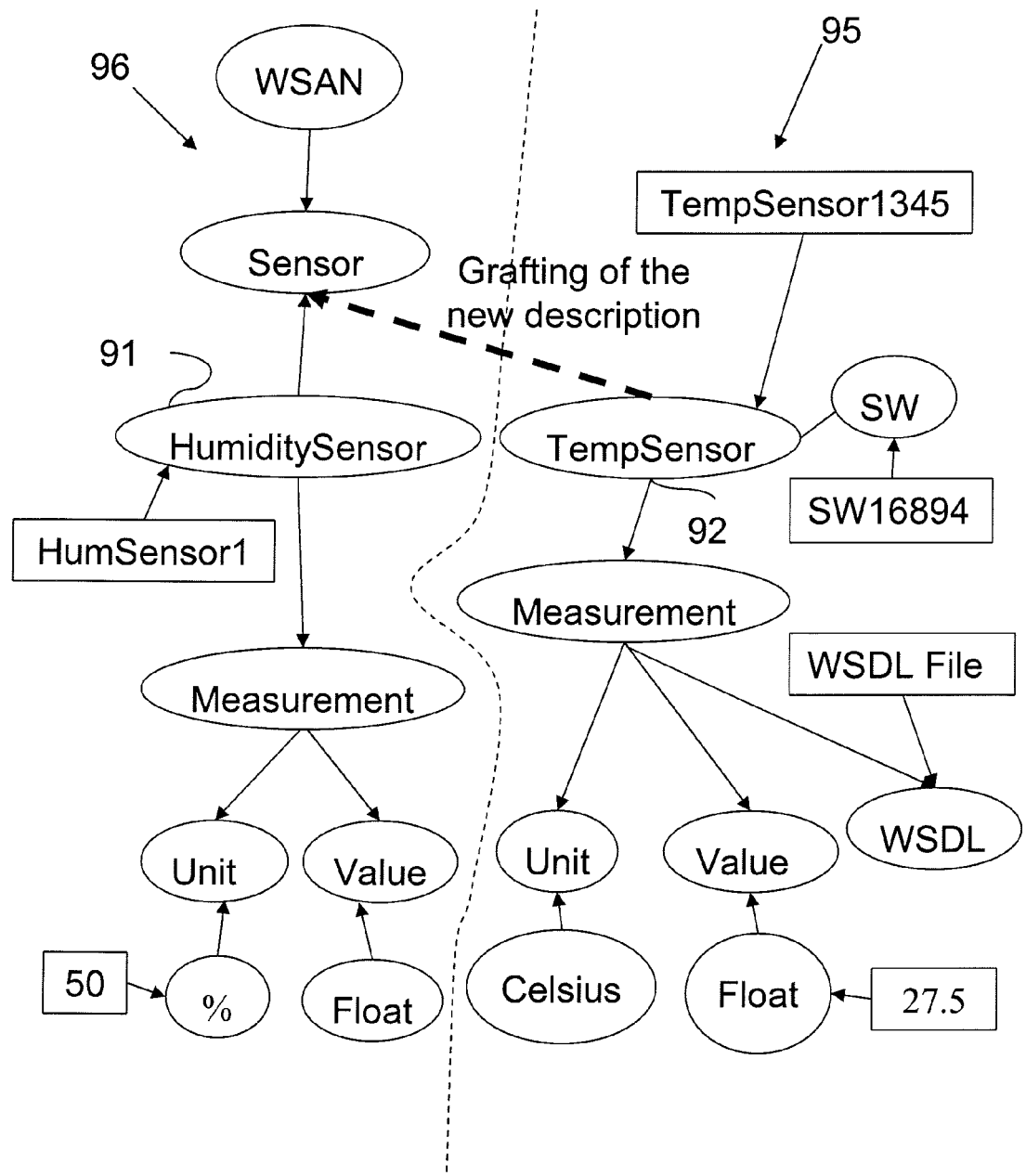
FIG. 9 illustrates the grafting of the description of a new sensor.

According to an exemplary embodiment of this invention, a WSAN sensor is described by an Ontology, according to the Semantic Web Technology, and FIG. 9 illustrates the "grafting" of an Ontology of a new temperature sensor 92 on a previous WSAN Sensor Ontology 96, only including a humidity sensor 91. Normally, a new sensor node includes new hardware and offers new sensor data and services that are not described in the WSAN Ontology of the WSAN Gateway. Thus, according to a further exemplary embodiment of this invention, the WSAN Gateway will receive the sensor node description, as well as drivers and service software associated with the new sensor node from the WSAN Manager, when a new sensor is attached to a WSAN and authenticated. The WSAN Gateway "grafts" the Ontology 95 of a new temperature sensor 92 to the WSAN sensor Ontology 96, the Ontology 95 describing the hardware, software and services of the new temperature sensor, thereby updating the sensor node description.

The WSAN Gateway will also ask the WSAN Manager if there exist any software regarding the WSAN as a whole, and not only for the new sensor. If so, the WSAN Gateway will download and store this software, as well. If the WSAN Gateway specifies important details, such as the hardware, the operating system and the software, the WSAN Manager will return the appropriate software to the WSAN Gateway, and the WSAN Gateway will store the software into a software repository. The WSAN Manager can also mediate the grafting between the two descriptions by the WSAN Gateway sending both the existing Ontology and the new sensor Ontology to the WSAN Manager, which can contact a $3^{rd}$ party Ontology composition service to assist the grafting.

Figure 10:
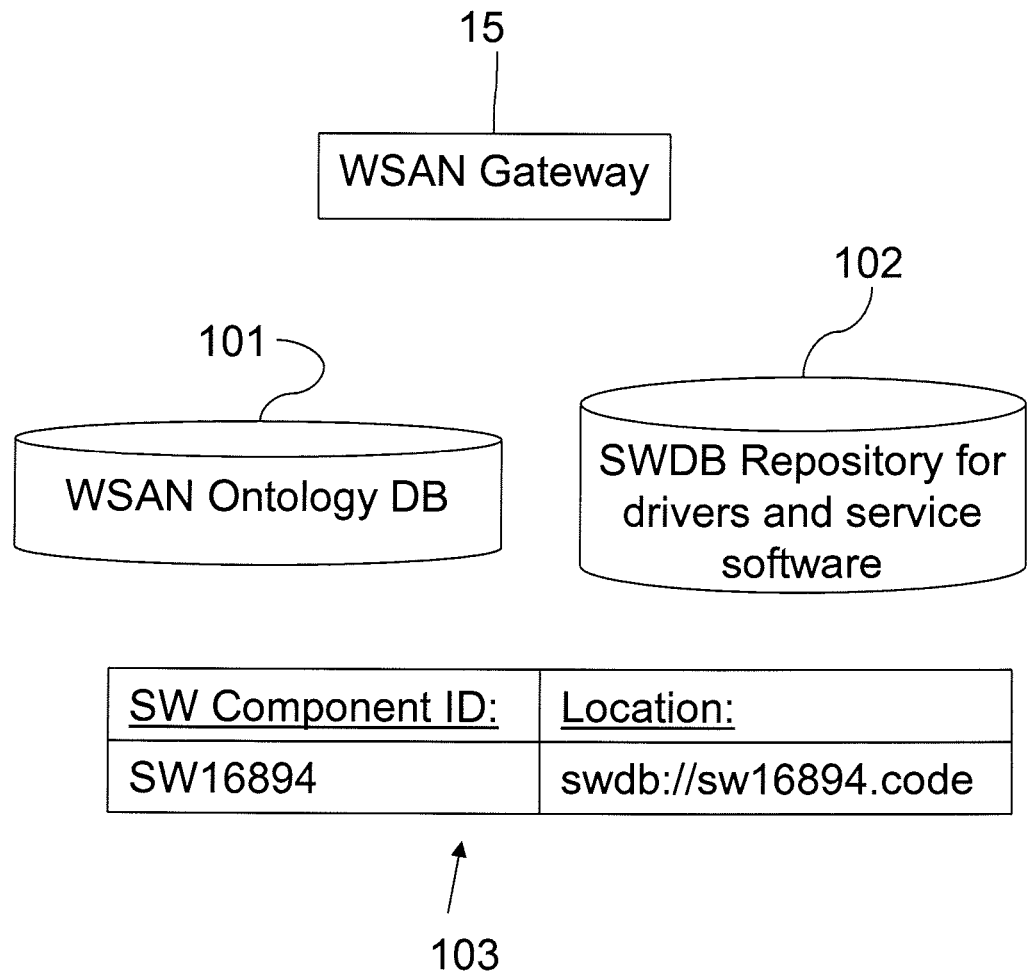
FIG. 10 is a block diagram illustrating the storing of the new sensor node description.

FIG. 10 illustrates a WSAN Gateway 15, a WSAN Ontology database 101 for storing the sensor node descriptions, and a software database repository 102 for storing the drivers and service software associated with the sensors. A description of a new sensor node includes an identification, i.e. SW16894, of the new software drivers and services, and the WSAN gateway 15 stores the binary code of these software components in the repository 102, and the identification and the location of the software in a lookup table 103. The WSAN Gateway also stores in the software database repository the services that are not associated with a specific sensor, but to a group of sensors in the WSAN. The insertion of an additional sensor will normally result in the downloading of software services associated with the new sensor and a few existing sensors.

Figure 11:
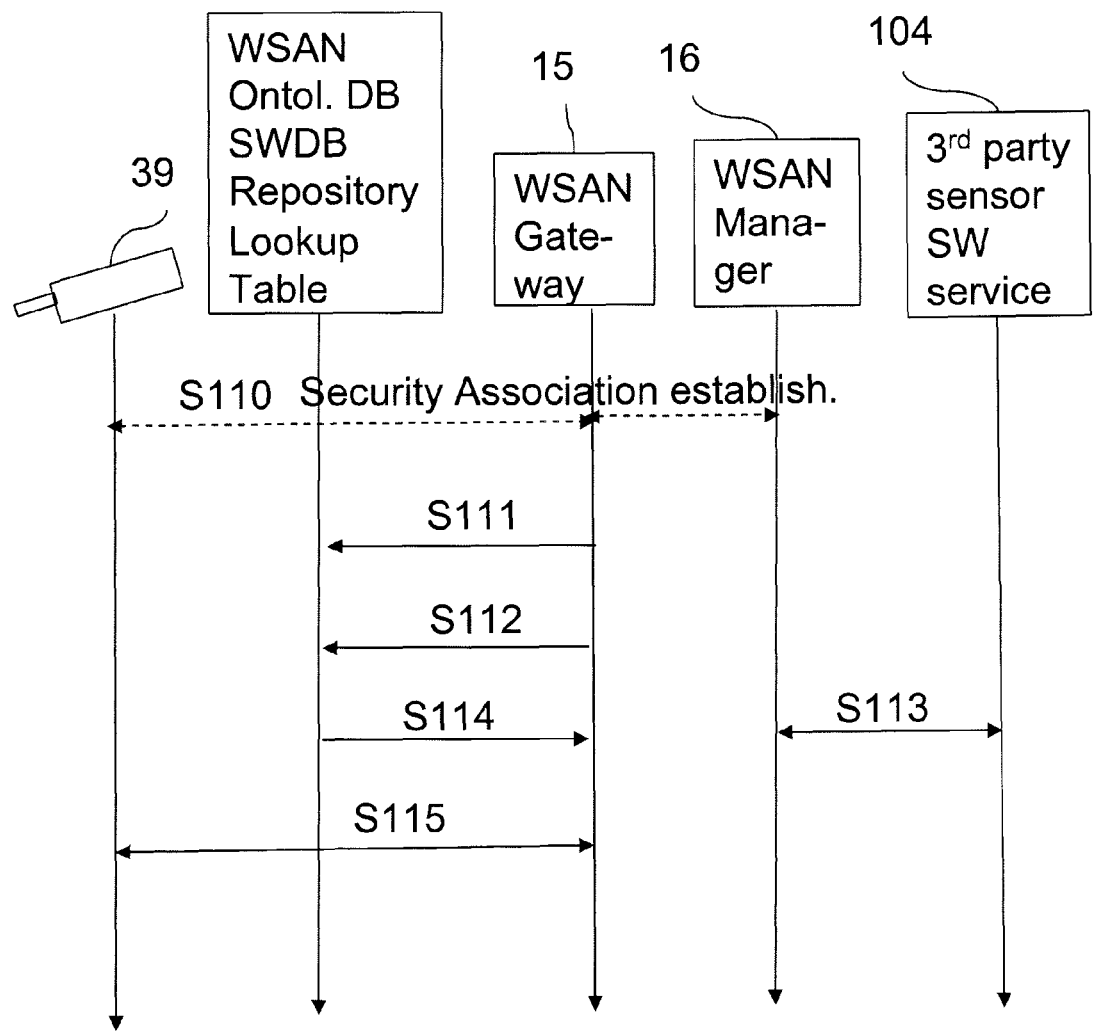
FIG. 11 is a signalling diagram illustrating the attachment of a new sensor to a WSAN.

FIG. 11 is a signalling diagram illustrating the handling of the software for an additional sensor attached to a WSAN, involving the above-described WSAN Ontology database 101, the SWDB Repository 102, and the lookup table 103. In step S110, the sensor is authenticated and a secure communication is established between the additional sensor 39 and the WSAN Gateway 15. In step S111, the WSAN Gateway updates the WSAN Ontology database 101, the SWDB Repository 102, and the lookup table 103 with the description of the new sensor node, as well as with the new software drivers and services, in step S112. The sensor node description and the software has been previously obtained by the WSAN Manager from the software database of the sensor manufacturer, and pushed down to the WSAN Gateway. Since the WSAN Manager knows the composition of the WSAN after the insertion of the additional sensor, it can contact a $3^{rd}$ party sensor software service 104, in step S113, which is able to retrieve software services and sell to the WSAN Manager, if it is provided with a description of the WSAN. Thereafter, the WSAN Manager can push these aggregate software services to the WSAN Gateway, as well.

When the WSAN Gateway receives a request for sensor data, the appropriate sensor node and software identification, e.g. SW 16894, is retrieved by the WSAN Gateway from the WSAN Ontology in the WSAN Ontology database 101, the appropriate location, e.g. swdb://16894.code, is retrieved by the WSAN Gateway from the look-up table 103, and the binary code is retrieved from the SWDB Repository 102, in step S114. Thereafter, in step S115, the WSAN Gateway uses the binary code to request the data from the sensor node, and the sensor responds with the appropriate data.

Thus, this invention offers an automatic attachment of an addition sensor in a WSAN, involving authentication and establishment of a secure communication between the sensor and the WSAN Gateway. Moreover, the new sensor could be used almost instantly, by means of an automatic updating of the WSAN service description and software in the WSAN Gateway based on the new sensor, as well as based on the composition of the whole WSAN, according to a further embodiment of this invention. Since this invention enables an automatic and network-assisted attachment of sensors to WSANs, involving different roles, such as the manufacturer of the sensor, the owner of the sensor node, and the WSAN Manager, the mapping of these roles onto different legal entities can be very flexible.

While the invention has been described with reference to specific exemplary embodiments, the description is in general only intended to illustrate the inventive concept and should not be taken as limiting the scope of the invention.

The invention claimed is:

1. A method, performed by an existing wireless or wired sensor and actuator network (WSAN) sensor, for attaching an additional sensor to a WSAN, comprising:
   receiving and storing, by the WSAN sensor, an indication of a private identity of a potential additional sensor from a WSAN gateway;
   receiving, by the WSAN sensor, from an additional sensor, a beacon comprising an indication of a private identity of the additional sensor when the additional sensor has been inserted in the WSAN;
   determining, by the WSAN sensor, whether the additional sensor is eligible for attachment to the WSAN by comparing the indication of the private identity received in the beacon with the stored indication of the private identity of the potential additional sensor; and
   sending, by the WSAN sensor, a notification of the insertion of an eligible additional sensor to the WSAN gateway, the notification comprising the indication of the private identity of the inserted eligible additional sensor.

2. The method of claim 1, wherein the step of determining whether the additional sensor is eligible for attachment further comprises checking that an activation time interval of the additional sensor has not expired, the activation time interval received and stored in connection with the indication of the private identity of the additional sensor.

3. The method of claim 1, further comprising receiving, by the existing WSAN sensor, a listening request from the WSAN gateway, the listening request indicating a listening status for the detection of a beacon from an additional sensor.

4. The method of claim 1, wherein the additional sensor performs the following steps after insertion in the WSAN:
   transmitting the indication of its private identity in a beacon to existing WSAN sensors;
   performing authentication with the WSAN gateway based on an authentication vector computed by a WSAN Manager.

5. The method of claim 4, wherein the authentication comprises establishment of a key shared between the additional sensor and the WSAN gateway based on said authentication vector.

6. The method according to claim 4, wherein the authentication is performed according to the AKA protocol.

7. The method of claim 1, wherein a private identity, ID_S and a secret sensor key of a sensor is pre-stored in a sensor database by the manufacturer, in connection with pointers to a software database.

8. A method for attaching an additional sensor to a wireless or wired sensor and actuator network (WSAN) comprising at least one existing WSAN sensor, the additional sensor transmitting an indication of its private identity to the at least one existing WSAN sensor after insertion in the WSAN, the method comprising:
   receiving, by the WSAN gateway, the indication of the private identity of the additional sensor from a WSAN Manager;
   transmitting, by the WSAN gateway, said received indication of the private identity of the additional sensor to the at least one existing WSAN sensor;
   receiving, by the WSAN gateway, a notification from the at least one existing WSAN sensor that the additional sensor is eligible for insertion in the WSAN after receiving the indication of the private identity of the additional sensor from the WSAN manager and said transmitting the received indication of the private identity to the at least one existing WSAN sensor, the notification comprising the indication of the private identity of the inserted eligible additional sensor; and
   performing, by the WSAN gateway, authentication of the inserted additional eligible sensor based on authentication information received from the WSAN Manager.

9. The method according to claim 8, wherein the WSAN gateway further transmits a listening request to the at least one existing WSAN sensor, the listening request indicating a listening status for detecting a beacon from the additional sensor.

10. The method according to claim 8, wherein the WSAN gateway further receives an activation time interval for the additional sensor from the WSAN manager and forwards the activation time interval to the at least one existing WSAN sensor, in connection with the transmission of the indication of the private identity of the additional sensor.

11. The method according to claim 8, wherein the WSAN gateway further transmits an authentication request comprising the private identity of the additional sensor to the WSAN Manager, after receiving the notification of the insertion of the additional eligible sensor in the WSAN.

12. The method according to claim 8, wherein the WSAN gateway receives a sensor description and sensor related software from the WSAN Manager, together with the authentication information.

13. The method according to claim 8, wherein the WSAN gateway performs the steps of:
   updating a WSAN ontology based on the received sensor description in response to determining that the sensor node description comprises an WSAN sensor ontology;
   storing the sensor related software in a local software database repository.

14. A method, performed by a wireless or wired sensor and actuator network (WSAN) manager, for attaching an additional sensor to a WSAN comprising at least one existing WSAN sensor, the method comprising:
   registering, by the WSAN manager, the additional sensor;
   retrieving, by the WSAN manager, a private identity and a secret sensor key of the additional sensor from a sensor database;
   transmitting, by the WSAN manager, an indication of the private identity of the additional sensor to a WSAN gateway;
   computing, by the WSAN manager, an authentication vector for authentication of the additional sensor, based on the secret sensor key, after receiving an authentication request from the WSAN gateway, the request comprising the private identity of the additional sensor; and
   transmitting, by the WSAN manager, the authentication vector to the WSAN gateway.

15. The method according to claim 14, wherein the WSAN manager determines an activation time interval for the additional sensor, and transmits the activation time interval to the WSAN gateway, together with the indication of the private identity of the additional sensor.

16. The method according to claim 14, wherein the WSAN manager sets up a secure communication channel to the WSAN gateway, after receiving the private identity of the additional sensor.

17. The method according to claim 14, wherein the WSAN manager retrieves a sensor description and sensor related software from a software database of the manufacturer, after receiving a request from the WSAN gateway.

18. The method according to claim 17, wherein the WSAN manager transmits the sensor description and the sensor related software to the WSAN gateway, together with the authentication vector.

19. A wireless or wired sensor and actuator network (WSAN) sensor adapted to communicate with a WSAN gateway and comprising an arrangement for attaching an additional sensor to a WSAN, the arrangement comprising a processing circuit configured to:
   receive and store, in the WSAN sensor, an indication of a private identity of a potential additional sensor from the WSAN gateway;
   receive, in the WSAN sensor, a beacon comprising an indication of a private identity of an additional sensor, the beacon emitted by the additional sensor after insertion in the WSAN;
   determine, in the WSAN sensor, whether the additional sensor is eligible for attachment to the WSAN by comparing the indication of the private identity received in the beacon with the stored indication, and
   send, from the WSAN sensor, a notification of the insertion of the eligible additional sensor to the WSAN gateway, the notification comprising the indication of the private identity of the eligible additional sensor.

20. The WSAN sensor according to claim 19, wherein the processing circuit is further configured to determine whether the additional sensor is eligible is by checking that an activation time interval of the additional sensor has not expired, the activation time interval received and stored in connection with the indication of the private identity of the additional sensor.

21. The WSAN sensor according to claim 19, wherein the processing circuit is further configured to activate a listening status depending on a listening request received from the WSAN gateway.

22. The WSAN sensor according to claim 19, wherein the processing circuit is further configured to:
   transmit the indication of the private identity in a beacon to existing WSAN sensors, after insertion into the WSAN; and
   perform an authentication with the WSAN gateway, based on an authentication vector from a WSAN Manager.

23. The WSAN sensor according to claim 19, wherein the processing circuit is further configured to perform authentication by arranging to establish a shared key with the WSAN gateway, based on an authentication vector.

24. A wireless or wired sensor and actuator network (WSAN) gateway arranged to communicate with a WSAN Manager and WSANsensors, the WSAN gateway comprising:
   a WSAN gateway arrangement for attaching an additional sensor to a WSAN comprising at least one existing WSAN sensor, the additional sensor transmitting an indication of its private identity to the at least one existing WSAN sensor after insertion in the WSAN, the WSAN gateway arrangement comprising a processing circuit configured to:
   receive the indication of the private identity of the additional sensor from the WSAN Manager, and for forwarding the indication to the at least one existing WSAN sensor;
   receive a notification from the at least one existing WSAN sensor that the additional sensor is eligible for insertion in the WSAN after receiving the indication of the private identity of the additional sensor from the WSAN manager and transmitting the received indication of the private identity to the at least one existing WSAN sensor; and
   authenticate the inserted additional sensor, based on an authentication vector received from the WSAN Manager.

25. The WSAN gateway according to claim 24, wherein the processing circuit is further configured to transmit a listening request to the at least one existing WSAN sensor, the listening request indicating a listening status for detecting a beacon from the additional sensor.

26. The WSAN gateway according to claim 24, wherein the processing circuit is further configured to receive an activation time interval for the additional sensor from the WSAN Manager and to forward to the at least one existing WSAN sensor, in connection with the transmission of the indication of the private identity.

27. The WSAN gateway according to claim 24, wherein the processing circuit is further configured to transmit an authentication request to the WSAN Manager, after receiving the notification of the insertion of the eligible additional sensor in the WSAN.

28. The WSAN gateway according to claim 24, wherein the processing circuit is configured to authenticate by establishing a shared security key, KS, with the inserted additional sensor.

29. The WSAN gateway according to claim 24, wherein the processing circuit is further configured to receive a sensor description and sensor related software from the WSAN Manager, together with the authentication vector.

30. The WSAN gateway according to claim 29, wherein the processing circuit is further configured to:
   update a WSAN ontology based on the received sensor description in response to determining that the sensor node description comprises a WSAN sensor ontology, update a WSAN ontology based on the received sensor description; and
   store the sensor related software in a local software database repository.

31. A wireless or wired sensor and actuator network (WSAN) manager for managing a WSAN and arranged to communicate with a WSAN gateway, the WSAN Manager comprising:
   an arrangement for attaching an additional sensor to a WSAN comprising at least one existing WSAN sensor, the arrangement comprising a processing circuit configured to:
      retrieve by the WSAN manager a private identity and a secret sensor key of the additional sensor from a sensor database after registering the additional sensor, and forward an indication of the private identity of the additional sensor to the WSAN gateway;
      compute in the WSAN manager an authentication vector for authentication of the additional sensor based on the secret sensor key, the computing performed after receiving an authentication request from the WSAN gateway; and
      forward the authentication vector to the WSAN gateway.

32. The WSAN manager according to claim 31, wherein the processing circuit is further configured to determine an activation time interval for the additional sensor, and to transmit the activation time interval to the WSAN gateway, together with the indication of the private identity.

33. The WSAN manager according to claim 31, wherein the processing circuit is further configured to pre-store the identity of a WSAN gateway associated with a user subscription.

34. The WSAN manager according to claim 31, wherein the processing circuit is further configured to retrieve a sensor description and sensor related software from a software database of the manufacturer, after receiving a request from the WSAN gateway.

35. The WSAN manager according to claim 34, wherein the processing circuit is further configured to transmit the sensor description and the sensor related software to the WSAN gateway, together with the authentication vector.

36. The method of claim 1, wherein the indication of the private identity of the potential additional sensor is received from the WSAN gateway before the beacon is received from the additional sensor.

37. The WSAN sensor of claim 19, wherein the indication of the private identity of the potential additional sensor is received from the WSAN gateway before the beacon is received from the additional sensor.

38. The method of claim 8, wherein the notification is based on a comparison between the indication of the private identity of the additional sensor and an indication of a private identity that the at least one existing WSAN sensor received in a beacon from a new sensor inserted in the WSAN.

39. The WSAN gateway of claim 24, wherein the notification is based on a comparison between the indication of the private identity of the additional sensor and an indication of a private identity that the at least one existing WSAN sensor received in a beacon from a new sensor inserted in the WSAN.

* * * * *